(12) United States Patent
Park et al.

(10) Patent No.: US 11,652,578 B2
(45) Date of Patent: May 16, 2023

(54) METHOD AND APPARATUS FOR DETERMINING TRANSMISSION TIMING IN WIRELESS COMMUNICATION SYSTEM

(71) Applicant: Samsung Electronics Co., Ltd., Suwon-si (KR)

(72) Inventors: Sungjin Park, Suwon-si (KR); Hyunseok Ryu, Suwon-si (KR); Jonghyun Bang, Suwon-si (KR); Jeongho Yeo, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 17/496,219

(22) Filed: Oct. 7, 2021

(65) Prior Publication Data

US 2022/0045802 A1 Feb. 10, 2022

Related U.S. Application Data

(63) Continuation of application No. 16/527,738, filed on Jul. 31, 2019, now Pat. No. 11,146,364.

(30) Foreign Application Priority Data

Jul. 31, 2018 (KR) .......................... 10-2018-0089512

(51) Int. Cl.
*H04L 1/18* (2006.01)
*H04L 5/00* (2006.01)
(Continued)

(52) U.S. Cl.
CPC .......... *H04L 1/1819* (2013.01); *H04L 5/0007* (2013.01); *H04L 5/0055* (2013.01);
(Continued)

(58) Field of Classification Search
CPC ................. H04L 1/1671; H04L 1/1819; H04L 1/1854; H04L 1/1861; H04L 5/0007;
(Continued)

(56) References Cited

U.S. PATENT DOCUMENTS 10,498,497 B2 12/2019 Yang et al.
11,146,364 B2 \* 10/2021 Park ...................... H04L 1/1819
(Continued)

FOREIGN PATENT DOCUMENTS

EP 2 822 207 A1 1/2015
WO 2020/204526 A1 10/2010
WO 2017/043916 A1 3/2017

OTHER PUBLICATIONS

Korean Office Action dated Jul. 25, 2022, issued in a counterpart Korean Application No. 10-2018-0089512.
3GPP; 3rd Generation Partnership Project; Technical Specification Group Radio Access Network; NR; Physical layer procedures for control (Release 15); 3GPP TS 38.213; V15.2.0; Jun. 2018; Valbonne, France.
(Continued)

*Primary Examiner* — Melvin C Marcelo
*Assistant Examiner* — Natali Pascual Peguero
(74) *Attorney, Agent, or Firm* — Jefferson IP Law, LLP

(57) ABSTRACT

A method for transmitting hybrid automatic repeat request acknowledgement (HARQ-ACK) information by a user equipment (UE) in a wireless communication system is provided. The method includes receiving a physical downlink control channel (PDCCH) including information for downlink semi-persistent scheduling (DL SPS) release from a base station and transmitting an uplink channel including HARQ-ACK information for the PDCCH including the information for DL SPS release to the base station, in which a first symbol of the uplink channel is transmitted at least after a processing time ($T_{proc,3}$) from when a last symbol of
(Continued)

the PDCCH is transmitted, and the processing time is determined based on a smaller value between a subcarrier spacing value of the PDCCH and a subcarrier spacing value of the uplink channel.

14 Claims, 9 Drawing Sheets

(51) Int. Cl.
  *H04W 72/04* (2009.01)
  *H04W 76/30* (2018.01)
  *H04L 1/1812* (2023.01)
(52) U.S. Cl.
  CPC ......... *H04L 5/0094* (2013.01); *H04W 72/042* (2013.01); *H04W 72/0493* (2013.01); *H04W 76/30* (2018.02)
(58) Field of Classification Search
  CPC ................. H04L 5/0044; H04L 5/0053; H04L 5/0055; H04L 5/0094; H04W 56/0045; H04W 72/0413; H04W 72/042; H04W 72/0493; H04W 76/30
  See application file for complete search history.

(56) References Cited

U.S. PATENT DOCUMENTS

2010/0195629 A1  8/2010  Chen et al.
2018/0212717 A1  7/2018  Yang et al.

OTHER PUBLICATIONS

3GPP; 3rd Generation Partnership Project; Technical Specification Group Radio Access Network; NR; Physical layer procedures for data (Release 15); 3GPP TS 38.214; V15.2.0; Jun. 2018; Valbonne, France.
International Search Report with Written Opinion dated Nov. 6, 2019; International Appln. No. PCT/KR2019/009558.
Extended European Search Report dated Jul. 26, 2021, issued in a counterpart European Application No. 19845071.0.
Samsung: "Support of Different Numerologies for Same Vertical", 3GPP TSG RAN WG1 #86bis, R1-1609047, Sep. 30, 2016, Lisbon, Portugal.
3GPP; 3rd Generation Partnership Project; Technical Specification Group Radio Access Network; NR; Physical layer procedures for control (Release 15); 3GPP TS 38.213; V15.3.0; Valbonne, France (Year: 2018).
Korean Notice of Allowance with English translation dated Oct. 26, 2022, issued in a counterpart Korean Application No. 10-2018-0089512.

* cited by examiner

METHOD AND APPARATUS FOR DETERMINING TRANSMISSION TIMING IN WIRELESS COMMUNICATION SYSTEM

CROSS-REFERENCE TO RELATED APPLICATION(S)

This application is a continuation application of prior application Ser. No. 16/527,738, filed on Jul. 31, 2019, which is based on and claims priority under 35 U.S.C § 119(a) of a Korean patent application number 10-2018-0089512, filed on Jul. 31, 2018, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for determining a transmission timing of a signal. More specifically, the disclosure relates to a method of determining a transmission timing when a user equipment (UE) transmits an uplink (UL) signal related to a downlink (DL) signal transmitted from a base station.

2. Description of Related Art

To satisfy soaring demands for wireless data traffic since commercialization of $4^{th}$-generation (4G) communication systems, efforts have been made to develop improved $5^{th}$-generation (5G) communication systems or pre-5G communication systems. For this reason, the 5G communication system or the pre-5G communication system is also referred to as a beyond-4G-network communication system or a post-long term evolution (LTE) system. The 5G communication system prescribed in the $3^{rd}$ Generation Partnership Project (3GPP) is called a new radio (NR) system. For higher data transmission rates, 5G communication systems are considered to be implemented on ultra-high frequency bands (mmWave), such as, e.g., 60 GHz. In the 5G communication system, beamforming, massive multi-input multi-output (MIMO), full dimensional MIMO (FD-MIMO), an array antenna, analog beamforming, and large-scale antenna technologies have been discussed to alleviate propagation path loss and to increase a propagation distance in the ultra-high frequency band, and have also been applied to NR systems. For system network improvement, in the 5G communication system, techniques such as an evolved small cell, an advanced small cell, a cloud radio access network (RAN), an ultra-dense network, device to device (D2D) communication, a wireless backhaul, a moving network, cooperative communication, coordinated multi-points (CoMPs), and interference cancellation have been developed. In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

The Internet, which is a human-oriented connectivity network where humans generate and consume information, is now evolving into the Internet of Things (IoT), where distributed entities, such as things, exchange and process information. The Internet of Everything (IoE) has also emerged, which is a combination of IoT technology and Big Data processing technology through connection with a cloud server, etc. To meet needs for technology elements, such as sensing technology, wired/wireless communication and network infrastructure, service interface technology, and security technology, for IoT implementation, a sensor network, machine to machine (M2M), machine type communication (MTC), and so forth have been recently researched for connection between things. Such an IoT environment may provide intelligent Internet technology (IT) services that create new value to human life by collecting and analyzing data generated among connected things. IoT may be applied to a variety of fields including smart homes, smart buildings, smart cities, smart cars or connected cars, smart grids, health care, smart appliances, advanced medical services, and so forth through convergence and combination between existing IT and various industries.

Thus, various attempts have been made to apply 5G communication systems to IoT networks. For example, 5G communication such as a sensor network, M2M, MTC, etc., has been implemented by a scheme such as beamforming, MIMO, an array antenna, and so forth. Application of the cloud RAN as the Big Data processing technology may also be an example of convergence of the 5G technology and the IoT technology.

As described above, various services may be provided along with development of a mobile communication system, needing a way to effectively provide such services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for effectively providing a service in a mobile communication system.

Additional aspects will be set forth in part in the description which follows and, in part, will be apparent from the description, or may be learned by practice of the presented embodiments.

In accordance with an aspect of the disclosure, a method for transmitting hybrid automatic repeat request acknowledgement (HARQ-ACK) information by a user equipment (UE) in a wireless communication system is provided. The method includes receiving a physical downlink control channel (PDCCH) including information for downlink semi-persistent scheduling (DL SPS) release from a base station and transmitting an uplink channel including HARQ-ACK information for the PDCCH including the information for DL SPS release to the base station, in which a first symbol of the uplink channel is transmitted at least after a processing time ($T_{proc,3}$) from when a last symbol of the PDCCH is transmitted, and the processing time is determined based on a smaller value between a subcarrier spacing value of the PDCCH and a subcarrier spacing value of the uplink channel.

The uplink channel may be a physical uplink shared channel (PUSCH) in which the HARQ-ACK is multiplexed.

The processing time ($T_{proc,3}$) may be calculated based on $T_{proc,3}$ $(N_3+d_3) \cdot (2048+144) \cdot \kappa \cdot 2^{-\mu} \cdot T_C$, in which $d_3$ is 1, µ is the smaller value between the subcarrier spacing value ($µ_{PDCCH}$) of the PDCCH and the subcarrier spacing value ($µ_{UL}$) of the uplink channel, $N_3$ is determined based on µ, $T_C$ is calculated based on $T_C=1/(\Delta f_{max} \cdot N_f)$, in which $\Delta f_{max}$ is 480·10³ Hz, $N_f$ is 4096, κ is κ=$T_s/T_c$=64, $T_s$ is $1/(\Delta f_{ref} \cdot N_{f,ref})$, $\Delta f_{ref}$ is 15·103 Hz, and $N_{f,ref}$ is 2048.

When µ is 15 kHz, $N_3$ may be 10, when µ is 30 kHz, $N_3$ may be 12, when µ is 60 kHz, $N_3$ may be 22, and when µ is 120 kHz, $N_3$ may be 25.

The first symbol of the uplink channel may be transmitted not before a first symbol with a cyclic prefix (CP) starting after the processing time from when the last symbol of the PDCCH is transmitted.

The PDCCH may include downlink control information (DCI) including the information for DL SPS release.

The HARQ-ACK information may include acknowledgement (ACK) information or negative acknowledgement (NACK) information of the PDCCH including the information for DL SPS release.

In accordance with another aspect of the disclosure, a user equipment (UE) is provided. The user equipment includes a transceiver and at least one processor coupled with the transceiver, in which the at least one processor configured to receive a physical downlink control channel (PDCCH) including information for downlink semi-persistent scheduling (DL SPS) release from a base station and transmit an uplink channel including hybrid automatic repeat request acknowledgement (HARQ-ACK) information for the PDCCH including the information for DL SPS release to the base station, in which a first symbol of the uplink channel is transmitted at least after a processing time ($T_{proc,3}$) from when a last symbol of the PDCCH is transmitted, and the processing time is determined based on a smaller value between a subcarrier spacing value of the PDCCH and a subcarrier spacing value of the uplink channel.

The uplink channel may be a physical uplink shared channel (PUSCH) in which the HARQ-ACK information is multiplexed.

The processing time ($T_{proc,3}$) may be calculated based on $T_{proc,3}$ ($N_3+d_3$)·(2048+144)·κ·$2^{-µ}$·$T_C$, in which $d_3$ may be 1, µ may be the smaller value between the subcarrier spacing value (µPDCCH) of the PDCCH and the subcarrier spacing value ($µ_{UL}$) of the uplink channel, $N_3$ may be determined based on µ, $T_C$ may be calculated based on $T_C=1/(\Delta f_{max} \cdot N_f)$, in which $\Delta f_{max}$ is 480·10³ Hz, and $N_f$ is 4096, and κ may be κ=$T_s/T_c$=64, $T_s$ is $1/(\Delta f_{ref} \cdot N_{f,ref})$, $\Delta f_{ref}$ is 15.103 Hz, and $N_{f,ref}$ is 2048.

When µ is 15 kHz, $N_3$ may be 10, when µ is 30 kHz, $N_3$ may be 12, when µ is 60 kHz, $N_3$ may be 22, and when µ is 120 kHz, $N_3$ may be 25.

The first symbol of the uplink channel may be transmitted not before a first symbol with a cyclic prefix (CP) starting after the processing time from when the last symbol of the PDCCH is transmitted.

The PDCCH may include downlink control information (DCI) including the information for DL SPS release.

The HARQ-ACK information may include acknowledgement (ACK) information or negative acknowledgement (NACK) information of the PDCCH including the information for DL SPS release.

In accordance with another aspect of the disclosure, a non-transitory computer-readable medium is provided. The non-transitory computer-readable medium includes program code, in which the program code that, when executed by a processor, causes the processor to receive a physical downlink control channel (PDCCH) including information for downlink semi-persistent scheduling (DL SPS) release from a base station and transmit an uplink channel including hybrid automatic repeat request acknowledgement (HARQ-ACK) information for the PDCCH including the information for DL SPS release to the base station, in which a first symbol of the uplink channel is transmitted at least after a processing time ($T_{proc,3}$) from a last symbol of the PDCCH is transmitted, and the processing time is determined based on a smaller value between a subcarrier spacing value of the PDCCH and subcarrier spacing value of the uplink channel.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
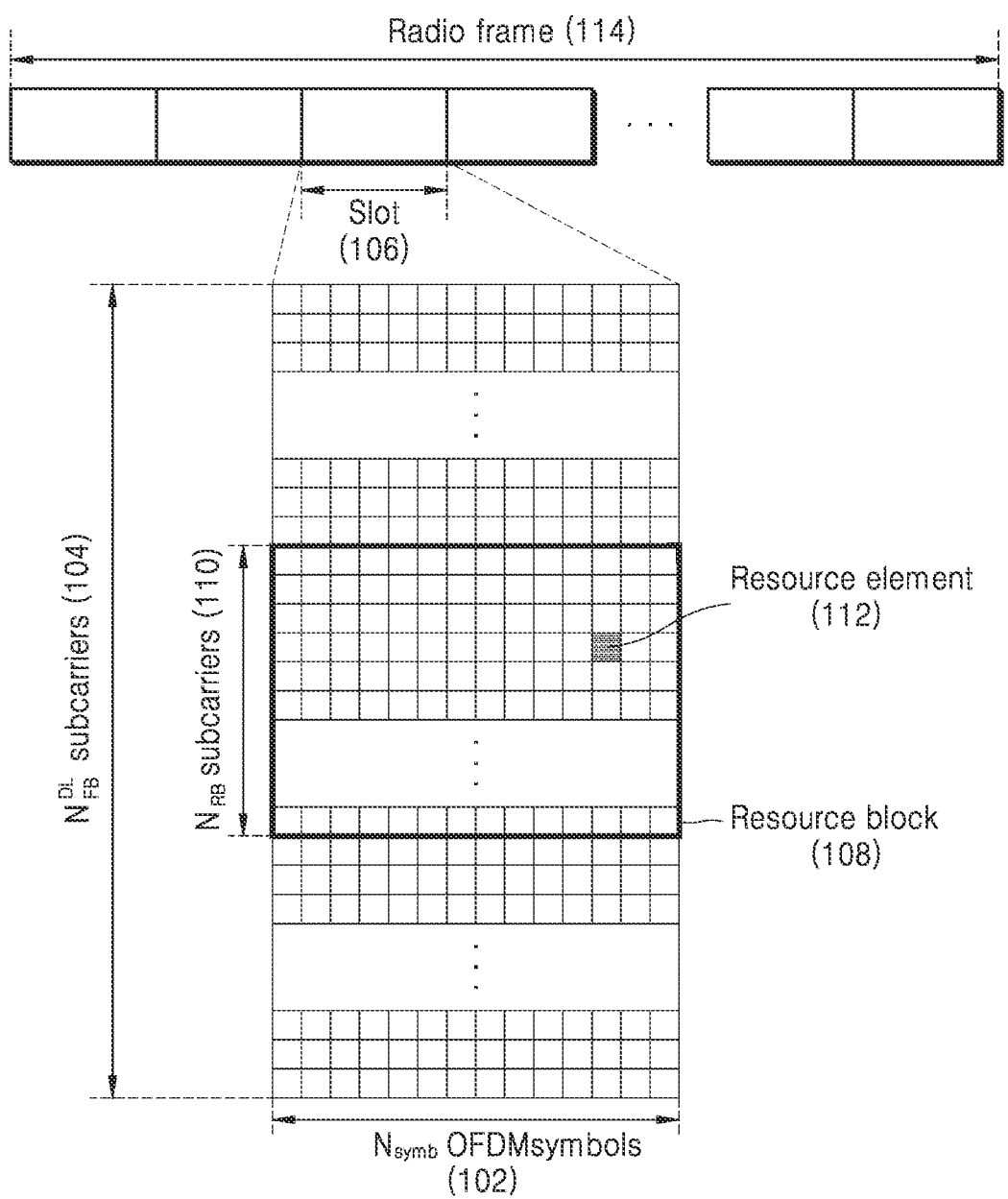
FIG. 1 illustrates a transmission architecture of a time-frequency resource domain that is a wireless resource domain in a 5$^{th}$ generation (5G) system, a new radio (NR) system, or a system similar thereto, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Hereinafter, various embodiments of the disclosure will be described in detail with reference to the accompanying drawings.

When the various embodiments of the disclosure are described, technical matters that are well known in a technical field of the disclosure and are not directly related to the disclosure will not be described. By omitting an unnecessary description, the subject matter of the disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to various embodiments of the disclosure described below together with the attached drawings. However, the disclosure is not limited to the disclosed embodiments of the disclosure, but may be implemented in various manners, and the various embodiments of the disclosure are provided to complete the disclosure of the disclosure and to allow those of ordinary skill in the art to understand the scope of the disclosure. The disclosure is defined by the category of the claims. Throughout the specification, an identical reference numeral will indicate an identical element.

Meanwhile, it is known to those skilled in the art that blocks of a flowchart and a combination of flowcharts may be represented and executed by computer program instructions. These computer program instructions may also be stored in a general-purpose computer, a special-purpose computer, or a processor of other programmable data processing devices, such that the instructions implemented the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order. For example, two blocks shown in succession may, in fact, be executed substantially concurrently or the blocks may sometimes be executed in the reverse order, depending on the functionality involved.

In the current embodiment of the disclosure, the term 'unit', as used herein, denotes a software or hardware component, such as a Field Programmable Gate Array (FPGA) or Application Specific Integrated Circuit (ASIC), which performs certain tasks. However, the meaning of 'unit' is not limited to software or hardware. A 'unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and 'unit(s)' may be combined into fewer components and 'unit(s)' or further separated into additional components and 'unit(s)'. In addition, components and 'unit(s)' may be implemented to execute one or more central processing units (CPUs) in a device or a secure multimedia card. In the various embodiments of the disclosure, 'unit' may include one or more processors.

A wireless communication system has evolved from an initial one that provides a voice-oriented service to a broadband wireless communication system that provides a high-speed and high-quality packet data service, like the communication standards, such as $3^{rd}$-Generation Partnership Project (3GPP) high speed packet access (HSPA), Long Term Evolution (LTE) or Evolved Universal Terrestrial Radio Access (E-UTRA), LTE-Advanced (LTE-A or E-UTRA Evolution), 3GPP2 high rate packet data (HRPD), Ultra Mobile Broadband (UMB), the Institute of Electrical and Electronics Engineers (IEEE) 802.16e, etc. As a 5G wireless communication system, 5G or new radio (NR) communication standards have been established.

A 5G or NR system as a representative example of a broadband wireless communication system adopts orthogonal frequency division multiplexing (OFDM) in a DL and a UL More specifically, cyclic-prefix (CP) OFDM is adopted in a DL, and discrete Fourier transform spreading (DFT-S) OFDM and CP-OFDM are adopted in a UL. The UL means a radio link through which a UE transmits data or a control signal to a base station (gNodeB or BS), and the DL means a radio link through which the base station transmits data or a control signal to the UE. The above-described multiple access scheme separates data or control information for each user by allocating and operating time-frequency resources on which the data or the control information is carried for each user, so that the time-frequency resources do not overlap each other, that is, so that orthogonality is realized.

The 5G or NR system employs a hybrid automatic repeat request (HARQ) scheme that retransmits data in a physical layer when decryption fails in initial transmission of the data. HARQ refers to a scheme in which when a receiver fails to accurately decrypt (decode) data, the receiver transmits information indicating a decoding failure, i.e., a negative acknowledgement (NACK), to a transmitter to allow the transmitter to retransmit the data in the physical layer. The receiver improves data reception performance by combining the data retransmitted by the transmitter with data that fails to be decoded previously. When accurately decoding the data, the receiver transmits information indicating a decoding success, i.e., an acknowledgement (ACK), to the transmitter to allow the transmitter to transmit new data.

New 5G communication, a new radio (NR) access technology system, has been designed to allow various services to be freely multiplexed in time and frequency resources, and thus waveform/numerology, a reference signal, etc., may be dynamically or freely allocated according to the need of a service. To provide an optimal service to a UE in wireless communication, optimized data transmission based on measurement of channel quality and interference quantity is needed, making accurate channel state measurement indispensable. However, unlike 4G communication in which channel and interference characteristics do not change largely with frequency resources, a 5G or NR channel has channel and interference characteristics that change largely with a service, requiring a support for a subset at a frequency resource group (FRG) level to allow separate measurement. In the 5G or NR system, a type of a supportable service may be categorized into enhanced mobile broadband (eMBB), massive machine type communications (mMTC), ultra-reliable and low-latency communications (URLLC), etc. The eMBB may be regarded as high-speed transmission of high-volume data, mMTC as minimization of power of the UE and accesses by multiple UEs, and URLLC as a service aiming at high reliability and low latency. Depending on a type of a service applied to the UE, different requirements may be applied.

In the disclosure, a first signal may be a signal expecting a response from the UE among signals the base station transmits to the UE. For example, in the disclosure, the first signal may be a UL scheduling grant signal or a DL data signal. In the disclosure, the second signal may be a response signal of the UE corresponding to the first signal. For example, in the disclosure, the second signal may be a UL data signal with respect to a UL scheduling grant signal or a HARQ ACK/NACK with respect to a DL data signal.

In the disclosure, a service type of the first signal may be categorized into eMBB, mMTC, URLLC, or the like. However, this is merely an example, and the service type of the first signal is not limited to the above-described categories in the disclosure.

In the disclosure, a Transmission Time Interval (TTI) length of the first signal may mean a length of time for which the first signal is transmitted. Also, in the disclosure, a TTI length of the second signal may mean a length of time for which the second signal is transmitted. In the disclosure, a second signal transmission timing may include information about when the UE is to transmit the second signal and when the base station is to receive the second signal, and may be used as the same meaning as a second signal transmission/reception timing.

In the disclosure, the terms as used herein are defined considering the functions in the disclosure and may be replaced with other terms according to the intention or practice of the user or operator. Therefore, the terms should be defined based on the overall disclosure. Hereinbelow, the base station is an entity that performs resource assignment of the UE, and may be at least one of gNode B (gNB), eNode B (eNB), Node B, a wireless access unit, a base station controller, or a node on a network. The UE may include user equipment (UE), a mobile station (MS), a cellular phone, a smartphone, a computer, or a multimedia system capable of performing communication functions. Needless to say, the disclosure is not limited to the example.

In the disclosure, a DL may mean a wireless transmission path of a signal for transmission from the base station to the UE, and a UL may mean a wireless transmission path of a signal for transmission from the UE to the base station. Although the NR system is to be used as an example, various embodiments of the disclosure may also be applied to various communication systems having similar technical backgrounds or channel forms. Also, the various embodiments of the disclosure may also be applied to other communication systems through some modifications within a range that does not largely depart from the scope of the disclosure based on determination of a skilled person.

In the disclosure, physical channel and signal of the related art may be used interchangeably with data or a control signal. For example, a physical downlink shared channel (PDSCH) is a physical channel for transmitting data, but in the disclosure, a PDSCH may be used as data.

In the disclosure, higher-layer signaling may include a signal delivery method for a signal delivered from the base station to the UE through a DL data channel of a physical layer or a signal delivery method for a signal delivered from the UE to the base station through a UL data channel of the physical layer. In the disclosure, higher-layer signaling may include radio resource control (RRC) signaling or a medium access control (MAC) control element (CE).

Along with the recent on-going research into next-generation communication systems, various schemes for scheduling communication with the UE have been discussed. Thus, there is a need for efficient scheduling and data transmission/reception schemes that consider characteristics of the next-generation communication systems.

As such, in a communication system, a plurality of services may be provided to a user, and to provide the plurality of services to the user, a method of providing each of the plurality of services in the same time period based on the characteristics and an apparatus using the method are required.

FIG. 1 illustrates a transmission architecture of a time-frequency resource domain that is a radio resource domain in a 5th generation (5G) system, a new radio (NR) system, or a system similar thereto, according to an embodiment of the disclosure.

Referring to FIG. 1, in a radio resource domain, the horizontal axis represents a time domain and the vertical axis represents a frequency domain. A minimum transmission unit in the time domain is an OFDM symbol, in which $N_{symb}$ OFDM symbols 102 are gathered to constitute one slot 106. The length of the subframe may be defined as 1.0 ms, and the length of a radio frame 114 may be defined as 10 ms. A minimum transmission unit in the frequency domain is a subcarrier, and the transmission bandwidth of the whole system includes subcarriers 104 in total. However, detailed values may be variably applied depending on a system.

In the time-frequency domain, a basic unit is a resource element (RE) 112, and may be indicated as an OFDM symbol index and a subcarrier index. A resource block (RB) 108 or a physical resource block (PRB) may be defined as $N_{symb}$ successive OFDM symbols 102 in the time domain or $N_{RB}$ successive subcarriers 110 in the frequency domain. Accordingly, one RB 108 includes $N_{symb} \times N_{RB}$ REs 112.

In general, the minimum transmission unit of data may be an RB unit. In the 5G or NR system, generally, $N_{symb}=14$, $N_{RB}=12$, and Cambria Math and $N_{RB}$ may be proportional to a bandwidth of a system transmission band. The data rate may be increased in proportion to the number of RBs scheduled for the UE. In the 5G or NR system, for a frequency division duplexing (FDD) system in which the DL and the UL are discriminated by frequencies and operated, the DL transmission bandwidth and the UL transmission bandwidth may differ from each other. The channel bandwidth indicates an RF bandwidth that corresponds to a system transmission bandwidth. Table 1 indicates a corresponding relationship between the system transmission bandwidth defined in the LTE system that is $4^{th}$-Generation (4G) wireless communication prior to the 5G or NR system, and the channel bandwidth. For example, the LTE system having a channel bandwidth of 10 MHz may have a transmission bandwidth composed of 50 RBs.

TABLE 1

| | Channel Bandwidth (Channel Bandwidth) $BW_{Channel}$ [MHz] | | | | |
|---|---|---|---|---|---|
| | 1.4 | 3 | 5 | 10 | 15 | 20 |
| Transmission Bandwidth Configuration*$N_{RB}$ | 6 | 15 | 25 | 50 | 75 | 100 |

The 5G or NR system may support a bandwidth that is broader than the channel bandwidth of LTE provided in Table 1. Table 2 shows a corresponding relationship among a system transmission bandwidth, a channel bandwidth, and subcarrier spacing (SCS) in the 5G or NR system.

TABLE 2

| SCS [kHz] | Channel Bandwidth $BW_{Channel}$ [MHz] | | | | | | | | |
|---|---|---|---|---|---|---|---|---|---|
| | 5 | 10 | 15 | 20 | 25 | 40 | 50 | 60 | 80 | 100 |
| Maximum Transmission Bandwidth Maximum | | | | | | | | | | |
| 15 | 25 | 52 | 79 | 106 | 133 | 216 | 270 | N.A. | N.A. | N.A. |
| 30 | 11 | 24 | 38 | 51 | 65 | 106 | 133 | 162 | 217 | 273 |
| 60 | N.A. | 11 | 18 | 24 | 31 | 51 | 65 | 79 | 107 | 135 |

TABLE 2-continued

| SCS [kHz] | Channel Bandwidth $BW_{Channel}$ [MHz] | | | | | | | | |
|---|---|---|---|---|---|---|---|---|---|
| | 5 | 10 | 15 | 20 | 25 | 40 | 50 | 60 | 80 | 100 |
| Transmission Bandwidth $N_{RB}$ | | | | | | | | | | |

In the 5G or NR system, scheduling information regarding DL data or UL data may be delivered from the base station to the UE through downlink control information (DCI). The DCI may be defined according to various formats, and according to each format, whether the DCI is scheduling information (UL grant) regarding UL data, is scheduling information (DL grant) regarding DL data, or is compact DCI having small-size control information, applies spatial multiplexing using multiple antennas, and is DCI for power control. For example, DCI format 1-1, which is scheduling control information (DL grant) regarding DL data, may include at least one of the following control information.

Carrier Indicator: indicates a frequency carrier in which a signal is transmitted.

DCI Format Indicator: indicates whether a DCI is for a DL or a UL.

Bandwidth Part (BWP) Indicator: indicates a BWP in which a signal is transmitted.

Frequency Domain Resource Assignment: indicates an RB of a frequency domain allocated for data transmission. A resource to be expressed may be determined based on a system bandwidth and a resource assignment scheme.

Time Domain Resource Assignment: indicates an OFDM symbol of a slot in which a data-related channel is to be transmitted.

VRB-to-PRB Mapping: indicates a scheme for mapping a virtual RB (VRB) index with a physical RB (PRB) index.

Modulation and Coding Scheme (MCS): indicates a modulation scheme and a coding rate used for data transmission. This indicates information about whether a modulation scheme is quadrature phase shift keying (QPSK), 16 quadrature amplitude modulation (16 QAM), 64 QAM, or 256 QAM, and a coding rate value indicating a transport block size (TBS) and channel coding information.

Codeblock Group (CBG) transmission information: indicates information about a CBG to be transmitted when CBG retransmission is set.

HARQ Process Number: indicates a process number of HARQ.

New Data Indicator: indicates whether transmission is HARQ initial transmission or retransmission.

Redundancy version: indicates a redundancy version of HARQ.

Transmit Power Control (TPC) command for Physical Uplink Control Channel (PUCCH): indicates a TPC command for a PUCCH that is a UL control channel.

For the aforementioned PUSCH transmission, time domain resource assignment may be delivered through information regarding a slot in which the PUSCH is to be transmitted, a start OFDM symbol position S in the slot, and an OFDM symbol number L that is the number of OFDM symbols to which the PUS CH is mapped. S may be a relative position from the start of the slot, and L may be the number of consecutive OFDM symbols. S and L may be determined from a start and length indicator value (SLIV) defined as below.

if (L−1)≤7 then
SLIV=14·(L−1)+S
else
SLIV=14·(14−L+1)+(14−1−S)
where 0<L≤14−S

In the 5G or NR system, for the UE, a table including an SLIV value, a PUSCH mapping type, and information about a slot in which a PUSCH is to be transmitted in one row may be generally configured through RRC configuration. In the following time domain resource assignment of the DCI, by indicating an index value of the above-described configured table, the base station may deliver an SLIV value, a PUSCH mapping type, and information about a slot in which a PUSCH is to be transmitted to the UE.

In the 5G or NR system, the PUSCH mapping type may be defined as a type A and a type B. In the PUSCH mapping type A, a first OFDM symbol among demodulation reference signal (DMRS) OFDM symbols may be located in a second or third OFDM symbol of the slot. In the PUSCH mapping type B, the first OFDM symbol among the DMRS OFDM symbols may be located in a first OFDM symbol of a time domain resource assigned for PUS CH transmission.

The DCI may be transmitted on a physical downlink control channel (PDCCH or control information, hereinafter used interchangeably) through channel coding and modulation.

Generally, the DCI may be scrambled with a particular radio network temporary identifier (RNTI, or a UE identifier) independently for each UE, and a cyclic redundancy check (CRC) is added to the DCI, which is then channel-coded and independently configured as a PDCCH for transmission. The PDCCH may be transmitted after the PDCCH is mapped in a control resource set CORESET configured in the UE.

The DL data may be transmitted on a PDSCH that is a physical channel for DL data transmission. The PDSCH may be transmitted after a control channel transmission period, and scheduling information such as a detailed mapping position, a modulation scheme, etc., in the frequency domain may be determined based on the DCI transmitted through the PDCCH.

Through the MCS among the control information of the DCI, the base station may notify the UE of a modulation scheme applied to the PDSCH to be transmitted and a size of data to be transmitted, a transport block size (TBS). According to an embodiment of the disclosure, the MCS may be composed of 5 bits or more or less. The TBS may correspond to the size before a channel coding for error correction is applied to the data, that is, a transport block (TB), which the base station intends to transmit.

In the disclosure, the TB may include a MAC header, a MAC CE, one or more MAC service data units (SDUs), padding bits, etc. The TB may indicate the unit of data transmitted down to the physical layer from the MAC layer or a MAC protocol data unit (PDU).

A modulation scheme supported in the 5G or NR system may be QPSK, 16 QAM, 64 QAM, and 256 QAM, and respective modulation orders Qm may correspond to 2, 4, 6, and 8. For QPSK modulation, 2 bits per symbol may be transmitted, and for 16 QAM, 4 bits per symbol may be transmitted. Further, 6 bits per symbol may be transmitted for 64 QAM, and 8 bits per symbol may be transmitted for 256 QAM.

Figure 2:
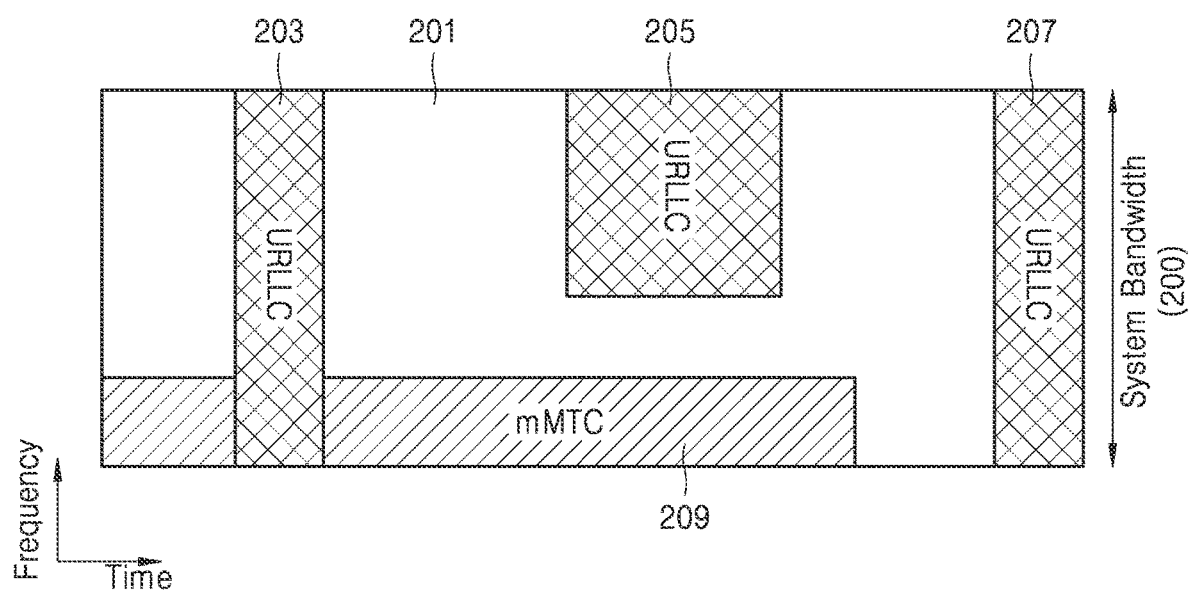
FIG. 2 is a view for describing a method of allocating data for enhanced mobile broadband (eMBB), ultra-reliable and low-latency communications (URLLC), and massive MCT (mMTC) in a 5G system, an NR system, or a system similar thereto in a frequency-time resource domain, according to an embodiment of the disclosure.

FIG. 2 is a view for describing a method of allocating data for eMBB, URLLC, and mMTC in a 5G system, an NR system, or a system similar thereto in a frequency-time resource domain, according to an embodiment of the disclosure.

Referring to FIG. 2, data for eMBB, URLLC, and mMTC may be assigned to an entire system frequency bandwidth 200. When pieces of URLLC data 203, 205, and 207 are generated and transmission thereof is required during transmission of an eMBB 201 and an mMTC 209 in a particular frequency band assigned thereto, a part of the entire system frequency bandwidth 200 to which the eMBB 201 and the mMTC 209 have already been assigned may be emptied, or the URLLC data 203, 205, and 207 may be transmitted while the eMBB 201 and the mMTC 209 are not transmitted.

The URLLC data 203, 205, and 207 may be assigned to a part of a resource assigned with the eMBB 201 and transmitted because a delay time of the URLLC among the aforementioned services needs to be reduced. When the URLLC is additionally assigned to the eMBB-assigned resource and transmitted, eMBB data may not be transmitted in the redundant frequency-time resources. As a result, transmission performance of the eMBB data may be lowered, and an eMBB data transmission failure due to the URLLC assignment may occur.

Figure 3:
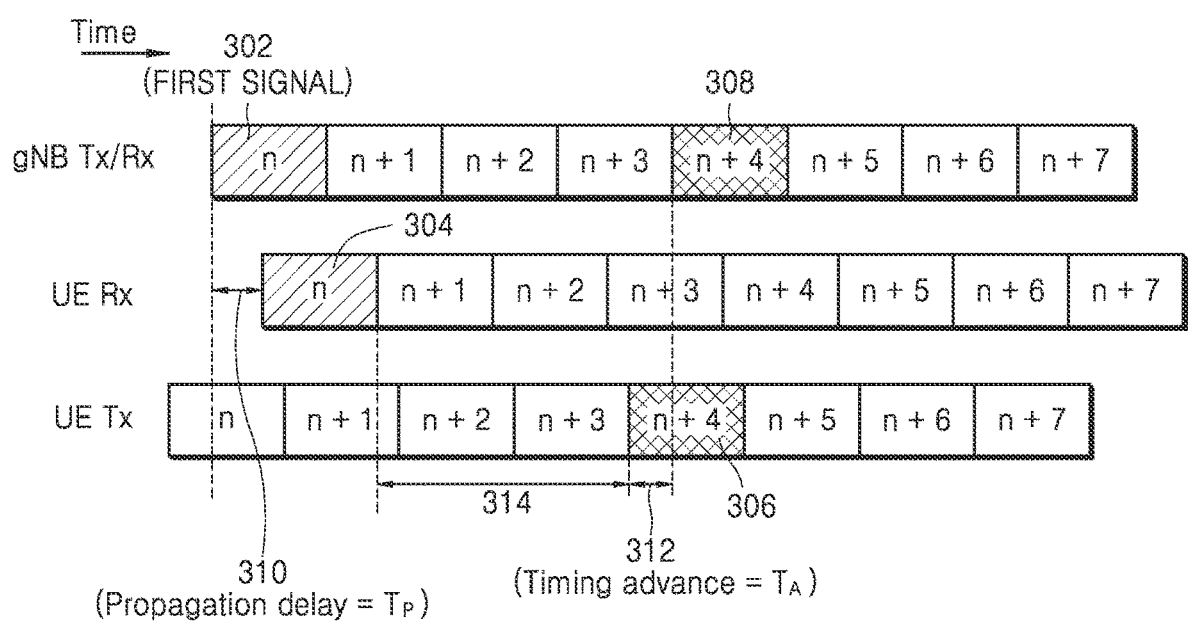
FIG. 3 is a view for describing a processing time of a UE based on timing advance when the UE receives a first signal and transmits a second signal in response to the first signal in a 5G system, an NR system, or a system similar thereto, according to an embodiment of the disclosure.

FIG. 3 is a view for describing a processing time of a UE based on timing advance when the UE receives a first signal and transmits a second signal in response to the first signal in a 5G system, an NR system, or a system similar thereto, according to an embodiment of the disclosure.

According to an embodiment of the disclosure, when the UE receives a first signal in a slot n 304, the UE may transmit a second signal corresponding to the first signal in a slot (n+4) 306. When a base station transmits the first signal in a slot n 302, the base station may receive a second signal in a slot (n+4) 308.

Referring to FIG. 3, when the base station transmits a UL scheduling grant, a DL control signal, or DL data to the UE in the slot n 302, the UE may receive the UL scheduling grant, the DL control signal, or the DL data in the slot n 304. The UE may receive the first signal later by a propagation delay $T_P$ 310 than a time when the base station transmits the first signal. When the UE transmits the second signal to the base station, the UE may transmit a HARQ ACK/NACK regarding UL data or DL data at a timing 306 preceding the slot (n+4) 308 for the first signal received by the UE by a timing advance $T_A$ 312, such that the second signal may arrive at the base station at a particular time.

A preparation time required for the UE to receive the UL scheduling grant and transmit the UL data or to receive the DL data and deliver the HARQ ACK or NACK may be a time 314 excluding $T_A$ from a time corresponding to three slots.

For the above-described timing determination, the base station may calculate an absolute value of $T_A$ of the UE. The base station may calculate the absolute value of $T_A$ by adding or subtracting a variance of $T_A$ delivered later through higher-layer signaling to or from $T_A$ initially delivered to the UE in a random access stage when the UE initially accesses the base station. In the disclosure, the absolute value of $T_A$ may be the value 312 resulting from subtraction of a start time of an $n^{th}$ transmission time interval (TTI) for reception of the UE from a start time of the $n^{th}$ TTI for transmission of the UE.

One of the important references for cellular wireless communication system performance is packet data latency. In the LTE system, signal transmission/reception may be performed in the unit of a subframe having a TTI of 1 ms. In the LTE system, a UE having a TTI shorter than 1 ms, short-TTI user equipment (UE) or a UE may be supported. In the 5G or NR system, a TTI may be shorter than 1 ms. The short-TTI UE may be suitable for services such as a Voice over LTE (VoLTE) service that is sensitive to a latency, remote control, etc. The short-TTI UE may be a means capable of implementing Internet of Things (IoT) that is mission-critical on a cellular basis.

According to an embodiment of the disclosure, in the 5G or NR system, when the base station transmits the PDSCH including the DL data, the base station may indicate a value K1 corresponding to timing information regarding transmission performed by the UE, of HARQ-ACK information of the PDSCH, in the DCI for scheduling the PDSCH.

When the HARQ-ACK information includes a timing advance and is not indicated to be transmitted prior to an OFDM symbol L1, the UE may transmit HARQ-ACK information to the base station. The HARQ-ACK information may include a timing advance and may be transmitted at a timing coinciding with or following the OFDM symbol L1 from the UE to the base station.

When the HARQ-ACK information includes a timing advance and is indicated to be transmitted prior to the OFDM symbol L1, the HARQ-ACK information transmitted from the UE to the base station may not be valid HARQ-ACK information. The OFDM symbol L1 may be the first UL OFDM symbol in which a CP starts after $T_{proc,1}$ from the last timing of the last OFDM symbol of the PDSCH. $T_{proc,1}$ may be calculated as in Equation 1.

$$T_{proc,1}=((N_1+d_{1,1}+d_{1,2})(2048+144)\cdot\kappa 2^{-\mu})\cdot T_C \quad \text{Equation 1}$$

In Equation 1, $N_1$, $d_{1,1}$, $d_{1,2}$, $\kappa$, $\mu$, and $T_C$ may be defined as below.

$N_1$ may be defined based on $\mu$ provided in Table 2 and Table 3, and $\mu$ may be equal to a value that produces the greatest $T_{proc,1}$ among ($\mu_{PDCCH}$, $\mu_{PDSCH}$, $\mu_{UL}$). $\mu$ may be $\mu=\min(\mu_{PDCCH}, \mu_{PDSCH}, \mu_{UL})$. $\mu_{PDCCH}$ may mean a subcarrier spacing of a PDCCH for scheduling a PDSCH. $\mu_{PDCCH}$ may mean a subcarrier spacing of a scheduled PDSCH. $\mu_{UL}$ may mean a subcarrier spacing of a UL channel in which an HARQ-ACK is transmitted.

When the HARQ-ACK is transmitted through a PUCCH (UL control channel), it is likely that $d_{1,1}=0$; when the HARQ-ACK is transmitted through a PUSCH (UL shared channel, data channel), it is likely that $d_{1,1}=1$.

When a plurality of activated configuration carriers or carriers are configured in the UE, a maximum timing difference between carriers may be reflected to transmission of the second signal.

When the PDSCH is of a mapping type A (the first DMRS OFDM symbol position is the third or fourth OFDM symbol of the slot), $d_{1,2}=7-i$ in case that a position index i of the last OFDM symbol of the PDSCH is less than 7. In the other cases, it is likely that $d_{1,2}=0$.

When the PDSCH is of the mapping type B for UE processing capability 1 (the first DMRS OFDM symbol position is the first OFDM symbol of the PDSCH), $d_{1,2}=3$ in case that a length of an assigned PDSCH is equal to 4 OFDM symbols, and $d_{1,2}=3+d$ in case that the length of the assigned PDSCH is equal to 2 OFDM symbols. Herein, d may indicate the number of OFDM symbols in which a scheduled PDSCH and a PDCCH including a control signal for scheduling the PDSCH overlap each other. In the other cases, it is likely that $d_{1,2}=0$.

When the PDSCH is of the mapping type B for UE processing capability 2 (the first DMRS OFDM symbol position is the first OFDM symbol of the PDSCH), $d_{1,2}$ may be equal to the number of OFDM symbols in which a scheduled PDSCH and a PDCCH including a control signal for scheduling the PDSCH overlap each other in case that the length of the assigned PDSCH is equal to 2 OFDM symbols or 4 OFDM symbols. In the other cases, it is likely that $d_{1,2}=0$.

$N_1$ may be defined by $\mu$ as in Table 2 or Table 3. $\mu=0$, 1, 2, and 3 may mean subcarrier spacings 15 kHz, 30 kHz, 60 kHz, and 120 kHz, respectively.

TABLE 3

PDSCH processing time for PDSCH processing capability 1

PDSCH Decoding Time $N_1$ [symbols]

| $\mu$ | No additional PDSCH DM-RS configured | Additional PDSCH DM-RS configured |
|---|---|---|
| 0 | 8 | 13 |
| 1 | 10 | 13 |
| 2 | 17 | 20 |
| 3 | 20 | 24 |

TABLE 4

PDSCH processing time for PDSCH processing capability 2

PDSCH Decoding Time $N_1$ [symbols]

| $\mu$ | No additional PDSCH DM-RS configured | Additional PDSCH DM-RS configured |
|---|---|---|
| 0 | 3 | 13 |
| 1 | 4.5 | 13 |
| 2 | 9 for FR 1 | 20 |

$N_1$ may be defined by a PDSCH processing capability of a UE as in Table 3 or Table 4.

In Equation 1, $T_C=1/(\Delta f_{max}\cdot N_f)$, $\Delta f_{max}=480\cdot 10^3$ Hz, $N_f=4096$, $\kappa=T_s/T_C=64$, $T_s=1/(\Delta f_{ref}\cdot N_{f,ref})$, $\Delta f_{ref}=15\cdot 10^3$ Hz, and $N_{f,ref}=2048$, respectively.

According to an embodiment of the disclosure, in the 5G or NR system, when the base station transmits control information including UL scheduling grant, the base station may indicate a value K2 corresponding to timing information for transmission, performed by the UE, of UL data or a PUSCH.

When the PUSCH includes a timing advance and is not indicated to be transmitted prior to an OFDM symbol L2, the UE may transmit the PUSCH to the base station. The PUSCH may include a timing advance and may be transmitted at a timing coinciding with or following the OFDM symbol L2 from the UE to the base station.

When the PUSCH includes a timing advance and is indicated to be transmitted prior to the OFDM symbol L2, the UE may ignore UL scheduling grant control information coming from the base station. The OFDM symbol L2 may be the first OFDM symbol in which a CP of a PUSCH OFDM symbol to be transmitted after $T_{proc,2}$ from the last timing of the last OFDM symbol of the PDCCH including a scheduling grant starts. $T_{proc,2}$ may be calculated as in Equation 2.

$$T_{proc,2}=\max\{((N_2+d_{2,1}d_{2,2})(2048+144)\cdot\kappa 2^{-\mu})\cdot T_C, d2, 3\} \quad \text{Equation 2}$$

In Equation 2, $N_2$, $d_{2,1}$, $d_{2,2}$, $d_{2,3}$, $\kappa$, $\mu$, and $T_C$ may be defined as below.

$N_2$ may be defined based on $\mu$ provided in Table 5 and Table 6, and $\mu$ may be equal to a value that produces the greatest $T_{proc,1}$ among ($\mu_{DL}$, $\mu_{UL}$). $\mu$ may be $\mu=\min(\mu_{DL}, \mu_{UL})$. $\mu_{DL}$ may mean a subcarrier spacing of a DL channel in which a PDSCH including a DCI for scheduling a PUSCH is transmitted. $\mu_{UL}$ may mean a subcarrier spacing of a UL channel in which a PUSCH is transmitted.

When the first OFMD symbol among PUSCH-assigned OFDM symbols includes a DMRS, $d_{2,1}=0$; in the other cases, $d_{2,1}=1$.

When a HARQ-ACK is multiplexed in the scheduled PUSCH, $d_{2,2}=1$; in the other cases, $d_{2,2}=0$.

When a plurality of activated configuration carriers or carriers are configured in the UE, a maximum timing difference between carriers may be reflected to transmission of the second signal.

When a DCI indicating bandwidth part (BWP) switching is scheduled, $d_{2,3}$ may mean a time required for BWP switching. In the other cases, it is likely that $d_{2,3}=0$.

$N_2$ may be defined by $\mu$ as in Table 5 or Table 6. $\mu=0, 1, 2$, and $3$ may mean subcarrier spacings 15 kHz, 30 kHz, 60 kHz, and 120 kHz, respectively.

TABLE 5

PUSCH preparation time for PUSCH timing capability 1

| $\mu$ | PUSCH preparation time (PUSCH preparation time) $N_2$ [symbols] |
|---|---|
| 0 | 10 |
| 1 | 12 |
| 2 | 23 |
| 3 | 36 |

TABLE 6

PUSCH preparation time for PUSCH timing capability 2

| $\mu$ | PUSCH preparation time (PUSCH preparation time) $N_2$ [symbols] |
|---|---|
| 0 | 3 |
| 1 | 4.5 |
| 2 | 9 for FR1 |

$N_2$ may be defined by a PUSCH timing capability of UE as in Table 4 or Table 5.

In Equation 2, $T_C=1/(\Delta f_{max} \cdot N_f)$, $\Delta f_{max}=480 \cdot 10^3$ Hz, $N_f=4096$, $\kappa=T_s/T_C=64$, $T_s=1/(\Delta f_{ref} \cdot N_{f,ref})$, $\Delta f_{ref}=15 \cdot 10^3$ Hz, and $N_{f,ref}=2048$, respectively.

Figure 4:
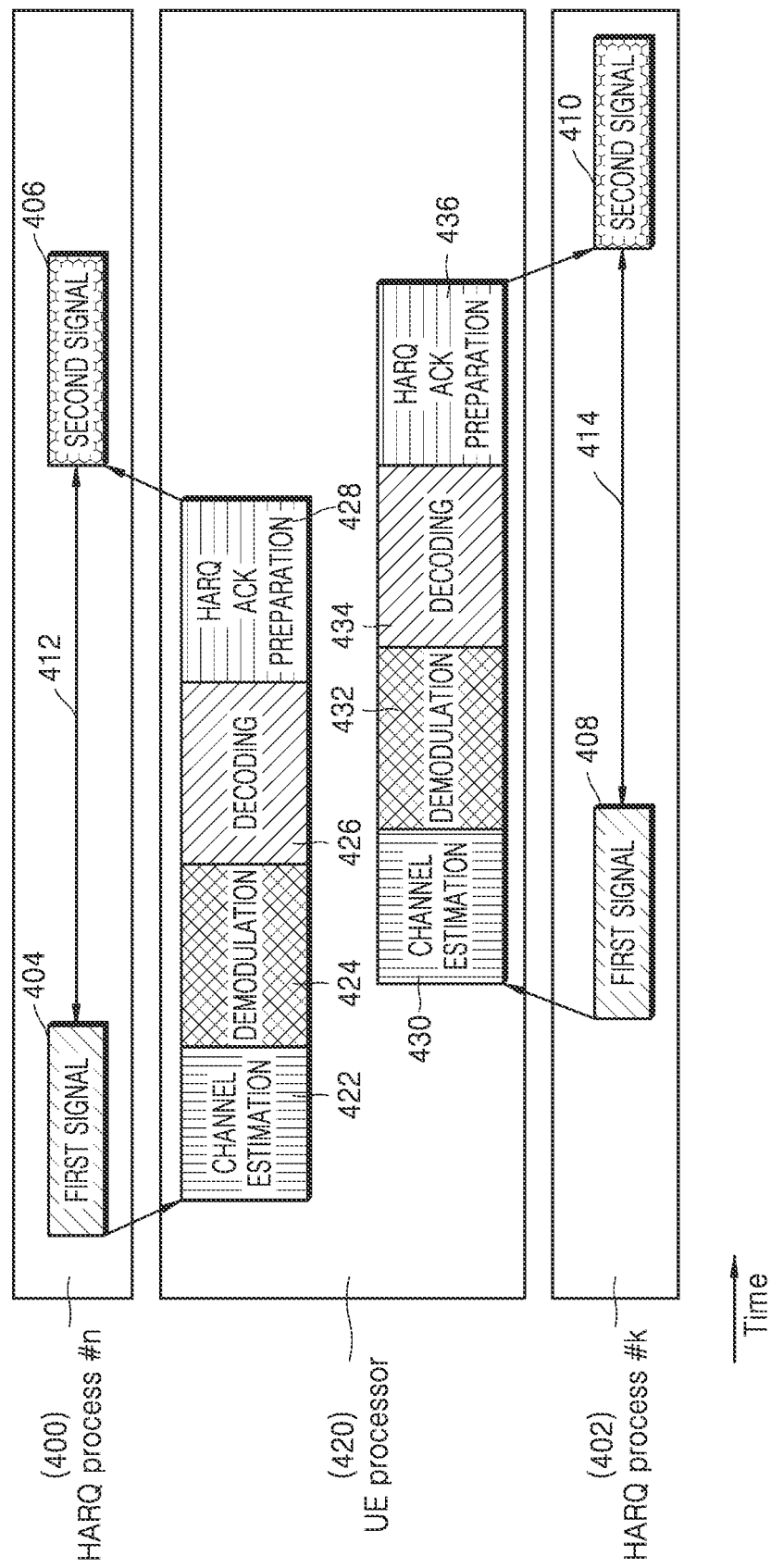
FIG. 4 is a view for describing a processing time of a UE based on generation of multiple hybrid automatic requests (HARQs) when the UE receives a first signal and transmits a second signal in response to the first signal in a 5G system, an NR system, or a system similar thereto, according to an embodiment of the disclosure.

FIG. 4 is a view for describing a processing time of a UE based on generation of multiple HARQs when the UE receives a first signal and transmits a second signal in response to the first signal in a 5G system, an NR system, or a system similar thereto, according to an embodiment of the disclosure.

Referring to FIG. 4, according to an embodiment of the disclosure, the base station may transmit a first signal 404 to the UE through an $n^{th}$ HARQ process 400, and the UE may transmit a second signal 406 corresponding to the first signal 404 to the base station. The UE may transmit the second signal 406 to the base station when a time interval 412 between the first signal 404 and the second signal 406 is greater than or equal to $T_{proc,1}$ (or $T_{proc,2}$). When the time interval 412 between the first signal 404 and the second signal 406 is less than $T_{proc,1}$ (or $T_{proc,2}$), the UE may ignore transmission of the second signal, drop transmission of the second signal, or transmit an invalid second signal to the base station.

According to an embodiment of the disclosure, the base station may transmit a first signal 408 to the UE through a $k^{th}$ HARQ process 402, and the UE may transmit a second signal 410 corresponding to the first signal 408 to the base station. The UE may transmit the second signal 410 to the base station when a time interval 414 between the first signal 408 and the second signal 410 is greater than or equal to $T_{proc,1}$ (or $T_{proc,2}$). When the time interval 414 between the first signal 408 and the second signal 410 is less than $T_{proc,1}$ (or $T_{proc,2}$), the UE may ignore transmission of the second signal, drop transmission of the second signal, or transmit an invalid second signal to the base station.

According to an embodiment of the disclosure, a UE process 420 may include UE processing for transmission and reception of a first signal and a second signal of an $n^{th}$ HARQ process 400 and a $k^{th}$ HARQ process 402. When the first signal is DL data information and the second signal is HARQ-ACK information, a UE processor that performs UE processing for transmission and reception of the first signal and the second signal may include channel estimation, demodulation, decoding, HARQ-ACK preparation blocks, and so forth. The UE may use the respective blocks one by one regardless of the number of HARQ processes.

According to an embodiment of the disclosure, the UE may perform channel estimation 422, demodulation 424, decoding 426, and HARQ-ACK preparation 428 to process a first signal 404 of an nth HARQ process 400 and a second signal 406 corresponding thereto. The UE may also perform channel estimation 430, demodulation 432, decoding 434, and HARQ-ACK preparation 436 to process a first signal 408 of a $k^{th}$ HARQ process 402 and a second signal 410 corresponding thereto.

In the 5G or NR system, the UE may basically process a first signal of each of multiple HARQ processes and a second signal corresponding to the first signal through a pipeline operation. Respective blocks of a UE processor may operate in parallel for each HARQ process as shown in FIG. 4. For example, until channel estimation 422 (or demodulation 424, decoding 426, or HARQ-ACK preparation 428) for processing the first signal 404 of the nth HARQ process 400 is completed in FIG. 4, channel estimation 430 (or demodulation 432, decoding 434, or HARQ-ACK preparation 436) for processing the first signal 408 of the $k^{th}$ HARQ process 402 may not be possible. The UE may support multiple HARQ processes while using less resources (e.g., the number of blocks of the processor or capabilities of the blocks, etc.) through a pipeline operation.

Figure 5:
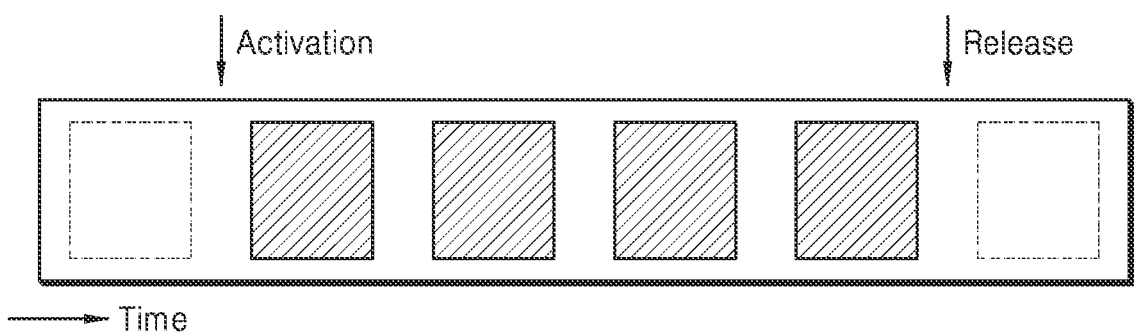
FIG. 5 is a view for describing downlink (DL) semi-persistent scheduling (SPS) or uplink (UL) grant type 2 operations, according to an embodiment of the disclosure.

FIG. 5 is a view for describing DL semi-persistent scheduling (SPS) or UL grant type 2 operations, according to an embodiment of the disclosure.

Referring to FIG. 5, DL SPS may mean downlink semi-persistent scheduling, and may also refer to a method in which the base station periodically transmits and receives DL data information to and from the UE based on information configured through higher-layer signaling without particular DL control information scheduling. DL SPS may be applied to Voice over Internet Protocol (VoIP) or periodically occurring traffic. The UE may perform DL data reception in a DL resource domain configured through higher-layer signaling. The base station may perform through L1 signaling, activation or release of the DL resource domain configured through higher-layer signaling.

UL grant type 2 or UL grant type 1 may be a method in which the base station periodically transmits and receives UL data information to and from the UE based on information configured through higher-layer signaling, without particular DL control information scheduling. UL grant type 2 or UL grant type 1 may be applied to VoIP or periodically occurring traffic. The UE may perform UL data transmission in a UL resource domain configured through higher-layer signaling. UL grant type 2 may be a method in which the base station may perform through L 1 signaling, activation or release of the UL resource domain configured through higher-layer signaling. UL grant type 1 may be a method in which the UE may determine that the UL resource domain configured through higher-layer signaling is activated, without separate L 1 signaling.

When two conditions provided below are satisfied for activation or release of SPS or UL grant type 2 scheduling, the UE may verify a DL SPS assignment PDCCH or a configured UL grant type 2 PDCCH.

When a CRC bit in a DCI format transmitted in a PDCCH is scrambled with a CS-RNTI configured through higher-layer signaling When a new data indicator (NDI) field for an activated transport block is set to 0

When a part of a field forming the DCI format transmitted through the DL SPS assignment PDCCH or the configured UL grant type 2 PDCCH is the same as a field configuration provided in Table 7 or Table 8, the UE may determine that information in the DCI format indicates valid activation or valid release of DL SPS or UL grant type 2. For example, when the UE detects the DCI format including information provided in Table 7, the UE may determine that DL SPS or UL grant type 2 is activated. When the UE detects the DCI format including information provided in Table 8, the UE may determine that DL SPS or UL grant type 2 is released.

When a part of a field forming the DCI format transmitted through the DL SPS assignment PDCCH or the configured UL grant type 2 PDCCH is not the same as the field configuration provided in Table 7 or Table 8, the UE may determine that a CRC in which the DCI format is not matched is detected.

TABLE 7

Special field configuration information for activation of DL SPS and UL grant type 2

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 8

Special field configuration information for release of DL SPS and UL grant type 2

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

When the UE receives a PDSCH without receiving a PDCCH or receives a PDCCH indicating SPS PDSCH release, the UE may generate a HARQ-ACK information bit corresponding to the received PDSCH or PDCCH. The UE may not expect transmission of HARQ-ACK information(s) regarding reception of two or more SPS PDSCHs in one PUCCH resource. The UE may include HARQ-ACK information regarding reception of one SPS PDSCH in one PUCCH resource.

DL SPS may be set in a primary (P) cell and a secondary (S) cell. DL SPS may not be set for two or more serving cells in one cell group. Parameters configured through DL SPS higher-layer signaling may include:

Periodicity: transmission period of DL SPS nrofHARQ-processes: the number of HARQ processes that may be set for DL SPS n1PUCCH-AN: a PUCCH HARQ resource for DL SPS, and the base station configure a resource with PUCCH format 0 or 1.

Figure 6:
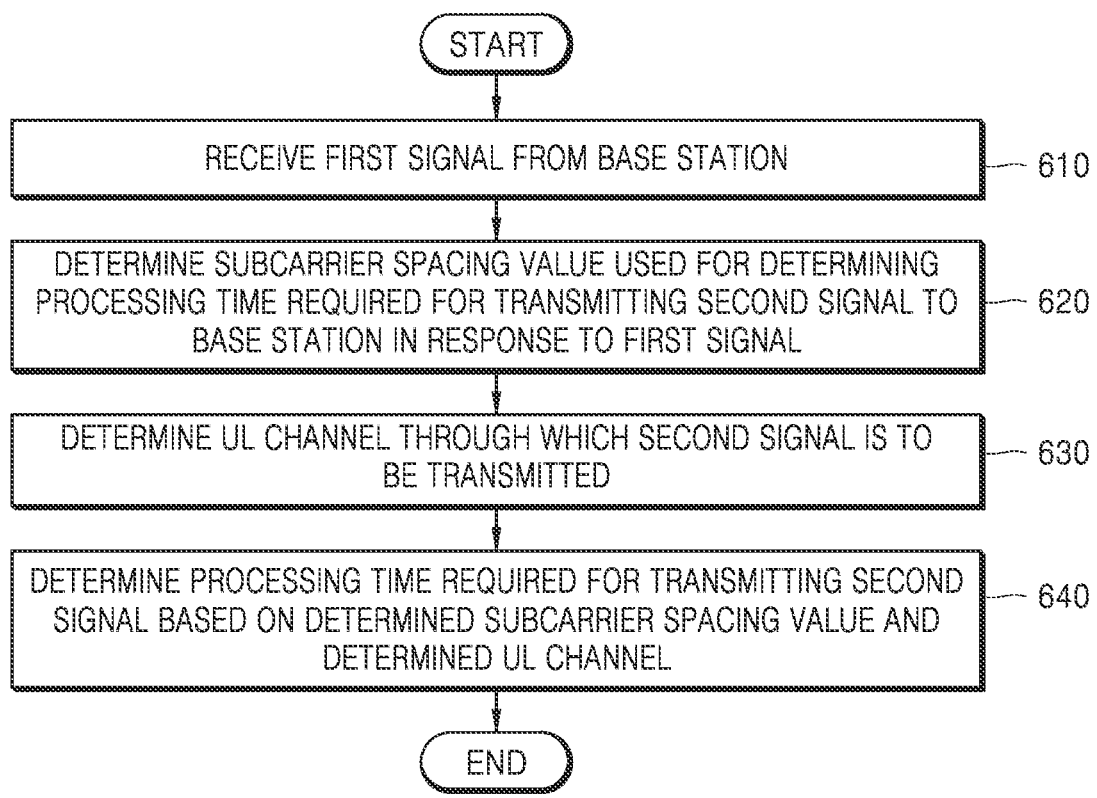
FIG. 6 is a flowchart of a method, performed by a UE, of determining a processing time for transmitting a second signal to a base station in response to a first signal regarding DL SPS release received from the base station, according to an embodiment of the disclosure.

FIG. 6 is a flowchart of a method, performed by a UE, of determining a processing time for transmitting a second signal to a base station in response to a first signal regarding DL SPS release received from the base station, according to an embodiment of the disclosure.

Herein below, for convenience, a processing time for transmitting a second signal to a base station will be shortly referred to as a processing time.

According to an embodiment of the disclosure, to release DL SPS, the UE may receive a first signal (e.g., DL SPS scheduling release) including configuration information of Table 8 and transmit a second signal (e.g., HARQ-ACK information) corresponding to the first signal to the base station. The second signal may be transmitted after N symbols from the last symbol of a PDCCH through which the first signal is transmitted. $N_3$ may vary with a subcarrier spacing, and Table 9 shows N with respect to a subcarrier spacing. When the second signal is scheduled to be transmitted before the N symbols from the last symbol of the PDCCH in which the first signal is transmitted, the UE may transmit an invalid second signal to the base station or may not transmit the second signal.

TABLE 9

N based on subcarrier spacing

| Subcarrier Spacing | 15 kHz | 30 kHz | 60 kHz | 120 kHz |
|---|---|---|---|---|
| N (symbol) | 10 | 12 | 22 | 25 |

Referring to FIG. 6, in operation 610, the UE may receive the first signal from the base station.

According to an embodiment of the disclosure, the first signal received by the UE from the base station may include information for releasing DL SPS. Information for releasing DL SPS may be included in the first signal as a part of DCI. Information for releasing DL SPS may include the configuration information of Table 8.

In operation 620, the UE may determine a subcarrier spacing value used for determining a processing time for transmitting the second signal to the base station in response to the first signal.

According to an embodiment of the disclosure, the second signal may include a HARQ ACK/NACK with respect to the first signal. For example, the second signal may include a HARQ ACK signal with respect to the first signal including the information for releasing DL SPS.

According to an embodiment of the disclosure, the UE may determine a subcarrier spacing value of the PDCCH in which the first signal is received, as the subcarrier spacing used for the UE to determine the processing time. Herein, the subcarrier spacing value of the PDCCH in which the first signal is received may mean a subcarrier spacing value applied to PDCCH scheduling.

The UE may determine the subcarrier spacing value used for the UE to determine the processing time, taking into account a time required for blind decoding multiple PDCCH candidates transmitted in the PDCCH. For example, the UE may determine the subcarrier spacing value used for determining the processing time to be the subcarrier spacing value of the PDCCH in which the first signal is received.

According to an embodiment of the disclosure, the UE may determine a subcarrier spacing value of a UL channel in which the second signal is to be transmitted, as the subcarrier spacing value used for the UE to determine the processing time. In this case, the subcarrier spacing value of a UL channel in which the second signal is to be transmitted may mean a subcarrier spacing value applied to scheduling of a UL channel in which the UE is to transmit the second signal.

The UE may determine the subcarrier spacing value used for determining the processing time, taking into account a time required for generation of a HARQ-ACK, after receiving a first signal (e.g., DCI) indicating DL SPS scheduling release. For example, the UE may determine the subcarrier spacing value used for determining the processing time to be a subcarrier spacing value of a UL channel in which the UE is to transmit a second signal including HARQ-ACK information to the base station.

According to an embodiment of the disclosure, the UE may determine the subcarrier spacing value used for determining the processing time to be the smaller one between the subcarrier spacing of the PDCCH in which the first signal is received and the subcarrier spacing value of the UL channel in which the UE is to transmit the second signal to the base station.

According to an embodiment of the disclosure, the UE may determine the subcarrier spacing value used for determining the processing time to be the greater one between the subcarrier spacing value of the PDCCH in which the first signal is received and the subcarrier spacing value of the UL channel in which the UE is to transmit the second signal to the base station.

In operation 630, the UE may determine the UL channel through which the second signal is to be transmitted.

According to an embodiment of the disclosure, the UE may determine a PUCCH as the UL channel through which the second signal is to be transmitted.

According to an embodiment of the disclosure, the UE may determine a PUSCH as the UL channel through which the second signal is to be transmitted. For example, when the UE transmits the HARQ-ACK information through multiplexing in the PUSCH, the UE may determine the PUSCH as the UL channel through which the second signal is to be transmitted.

In operation 640, the UE may determine the processing time based on the subcarrier spacing value used for determining the processing time and the UL channel in which the second signal is to be transmitted.

According to an embodiment of the disclosure, when the UE determines the PUCCH as the UL channel in which the second signal is to be transmitted, the UE may determine the processing time to be a preset value corresponding to the subcarrier spacing value used for determining the processing time. The preset value corresponding to the subcarrier spacing value used for determining the processing time may be N provided in Table 9.

The UE may determine the subcarrier spacing value of the PDCCH through which the first signal is received, as the subcarrier spacing value used for determining the processing time, and determine N corresponding to the subcarrier spacing value of the PDCCH as provided in Table 9 to be the processing time. For example, when the subcarrier spacing value of the PDCCH is 15 kHz, the UE may determine the processing time to be N=10 symbols.

According to an embodiment of the disclosure, when the UE determines the PUSCH as the UL channel in which the second signal is to be transmitted, the UE may determine the processing time based on a compensation time and a preset value corresponding to the subcarrier spacing value used for determining the processing time.

The preset value corresponding to the subcarrier spacing value used for determining the processing time may be N provided in Table 9. The UE may determine the subcarrier spacing value of the PDCCH through which the first signal is received, as the subcarrier spacing value used for determining the processing time, and determine N corresponding to the subcarrier spacing value of the PDCCH as provided in Table 9.

The UE may determine a value resulting from adding the compensation time to the determined N, as the processing time. For example, the UE may determine a value (N+k) resulting from adding the compensation time, k symbols, to the determined N, as the processing time. Herein, k may be a natural number greater than or equal to 1.

When the HARQ-ACK information is multiplexed in the PUSCH, the UE may need a longer processing time for transmitting the second signal including the HARQ-ACK information. Thus, the UE may need a longer processing time for transmitting the second signal, when compared to a case where the second signal is transmitted through the PUCCH.

Figure 7:
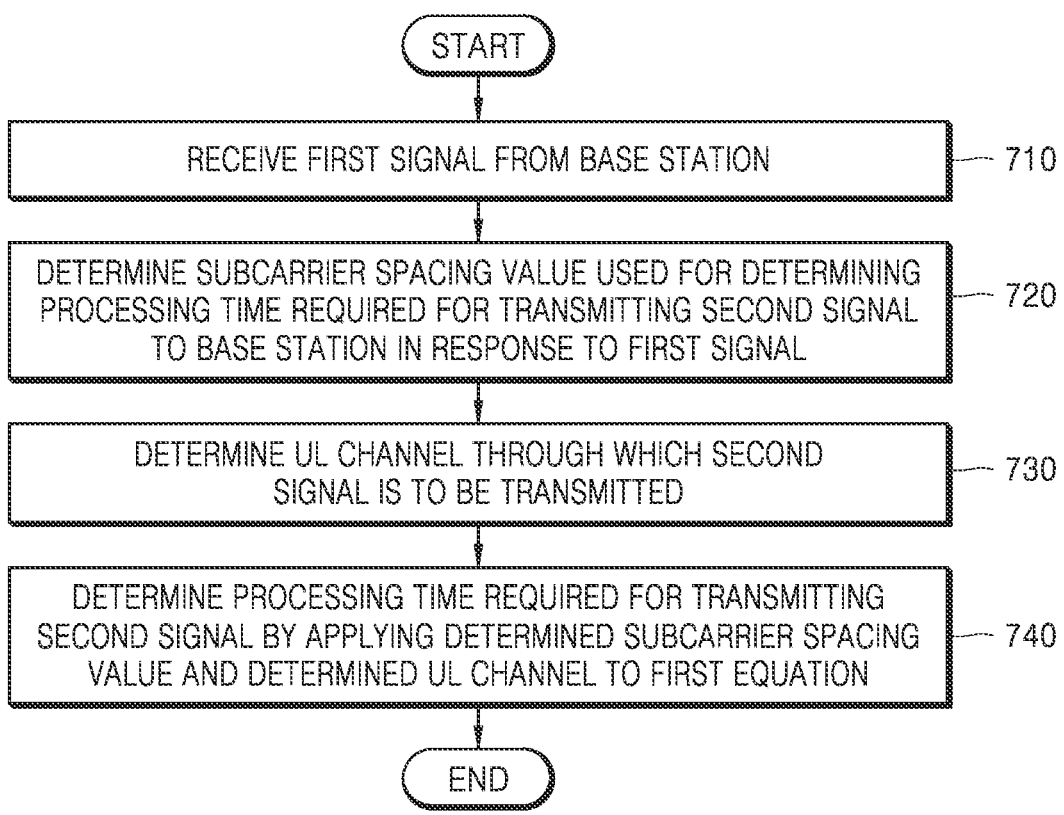
FIG. 7 is a flowchart of a method, performed by a UE, of determining a processing time for transmitting a second signal to a base station in response to a first signal regarding DL SPS release received from the base station, according to an embodiment of the disclosure.

FIG. 7 is a flowchart of a method, performed by the UE, of determining a processing time required for transmitting a second signal to a base station in response to a first signal regarding DL SPS release received UE from the base station, according to an embodiment of the disclosure.

Herein below, for convenience, a processing time required for the UE to transmit a second signal to a base station will be shortly referred to as a processing time.

According to an embodiment of the disclosure, in the 5G or NR system, when the base station transmits the first signal (or the PDCCH) for DL SPS release, the base station may indicate a value K1 corresponding to timing information regarding transmission, performed by the UE, of HARQ-ACK information of DL SPS release, in the DCI for scheduling the PDCCH.

When the HARQ-ACK information includes a timing advance and is not indicated to be transmitted prior to an OFDM symbol L3, the UE may transmit HARQ-ACK information to the base station. The HARQ-ACK information may include a timing advance and may be transmitted at a timing coinciding with or following the OFDM symbol L3 from the UE to the base station.

When the HARQ-ACK information includes a timing advance and is indicated to be transmitted prior to the OFDM symbol L3, the HARQ-ACK information transmitted from the UE to the base station may not be valid HARQ-ACK information. The OFDM symbol L3 may be the first OFDM symbol in which a CP starts after $T_{proc,3}$ from the last timing of the last OFDM symbol of the PDCCH through which DL SPS release is transmitted. $T_{proc,3}$ may be calculated as in Equation 3.

$$T_{proc,3} = ((N_3 + d_3)(2048 + 144) \cdot \kappa 2^{-\mu}) \cdot T_C \qquad \text{Equation 3}$$

$N_3$ may be defined based on a subcarrier spacing value provided in Table 9.

When a plurality of activated configuration carriers or carriers are configured in the UE, a maximum timing difference between carriers may be reflected to transmission of the second signal.

In Equation 3, $T_C=1/(\Delta f_{max} \cdot N_f)$, $\Delta f_{max}=480 \cdot 10^3$ Hz, $N_f=4096$, $\kappa=T_s/T_C=64$, $T_s=1/(\Delta f_{ref} \cdot N_{f,ref})$, $\Delta f_{ref}=15 \cdot 10^3$ Hz, and $N_{f,ref}=2048$, respectively.

Referring to FIG. 7, in operation 710, the UE may receive the first signal from the base station. Operation 710 may correspond to operation 610 of FIG. 6.

In operation 720, the UE may determine a subcarrier spacing value used for determining a processing time for transmitting the second signal to the base station in response to the first signal.

According to an embodiment of the disclosure, the second signal may include a HARQ ACK/NACK with respect to the first signal. For example, the second signal may include a HARQ ACK signal with respect to the first signal including the information for releasing DL SPS.

According to an embodiment of the disclosure, the UE may determine a subcarrier spacing value of the PDCCH in which the first signal is received, as the subcarrier spacing value used for the UE to determine the processing time. Herein below, the subcarrier spacing value of the PDCCH through which the first signal is received will be referred to as $\mu_{PDCCH}$.

According to an embodiment of the disclosure, the UE may determine a subcarrier spacing value of a UL channel in which the second signal is to be transmitted, as the subcarrier spacing value used for the UE to determine the processing time. Herein below, the subcarrier spacing value of the UL channel through which the second signal is to be transmitted will be referred to as $\mu_{UL}$.

According to an embodiment of the disclosure, the UE may determine the subcarrier spacing value used for determining the processing time to be the smaller one (min ($\mu_{PDCCH}$, $\mu_{UL}$)) between the subcarrier spacing $\mu_{PDCCH}$ of the PDCCH in which the first signal is received and the subcarrier spacing value $\mu_{UL}$ of the UL channel in which the UE is to transmit the second signal to the base station.

According to an embodiment of the disclosure, the UE may determine the subcarrier spacing value used for determining the processing time to be the greater one (max ($\mu_{PDCCH}$, $\mu_{UL}$)) between the subcarrier spacing $\mu_{PDCCH}$ of the PDCCH in which the first signal is received and the subcarrier spacing $\mu_{UL}$ of the UL channel in which the UE is to transmit the second signal to the base station.

In operation 730, the UE may determine the UL channel through which the second signal is to be transmitted.

According to an embodiment of the disclosure, the UE may determine a PUCCH (UL control channel) as the UL channel through which the second signal is to be transmitted to the base station.

According to an embodiment of the disclosure, the UE may determine a PUSCH as the UL channel through which the second signal is to be transmitted to the base station. For example, when the UE transmits the HARQ-ACK information to the base station through multiplexing in the PUSCH, the UE may determine the PUSCH (UL shared channel, data channel) as the UL channel through which the second signal is to be transmitted.

In operation 740, the UE may determine the processing time by applying, to a first equation, the subcarrier spacing value used for determining the processing time and the UL channel in which the second signal is to be transmitted.

According to an embodiment of the disclosure, when the first equation is Equation 3, $\mu$ of the first equation may be the subcarrier spacing value used for determining the processing time. For example, $\mu$ may be $\mu_{PDCCH}$ or $\mu_{UL}$ depending on a determination of the UE.

According to an embodiment of the disclosure, when the first equation is Equation 3, $N_3$ of the first equation may be N provided in Table 9, which corresponds to the subcarrier spacing value $\mu$ used for determining the processing time.

According to an embodiment of the disclosure, when the first equation is Equation 3, the UE may determine $d_3$ of the first equation based on the subcarrier spacing of the UL channel through which the second signal is to be transmitted. When the UE determines the PUCCH as the UL channel through which the second signal is to be transmitted, the UE may determine $d_3$ as 0. When the UE determines the PUSCH as the UL channel through which the second signal is to be transmitted, the UE may determine $d_3$ as 1.

According to an embodiment of the disclosure, when the first equation is Equation 3, the UE may apply $\mu$, $N_3$, and $d_3$ to the first equation based on the subcarrier spacing value used for determining the processing time and the UL channel through which the UE is to transmit the second signal, thus obtaining $T_{proc,3}$. The UE may determine the obtained $T_{proc,3}$ as the processing time.

For example, the UE may determine the subcarrier spacing value $\mu_{PDCCH}$ of the PDCCH in which the first signal is received, as the subcarrier spacing used for the UE to determine the processing time, and apply the determined subcarrier spacing to $\mu$ of the first equation. The UE may apply N provided in Table 9, which corresponds to $\mu=\mu_{PDCCH}$, to the first equation. When the UE determines the PUCCH as the UL channel through which the second signal is to be transmitted, the UE may determine $d_3$ to the first equation based on the determined UL channel.

When the subcarrier spacing value $\mu_{PDCCH}$ of the PDCCH is 15 kHz, the UE may apply $\mu=15$ kHz to the first equation. In Table 9, N corresponding to $\mu=15$ kHz is 10, and the UE may apply the first equation to $N_3=10$. When the UE determines the PUCCH as the UL channel through which the second signal is to be transmitted, the UE may apply $d_3=0$ to the first equation. The UE may determine the processing time to be $T_{proc,3}$ obtained by applying $\mu=15$ kHz, $N_3=10$, and $d_3=0$ to the first equation.

Figure 8:
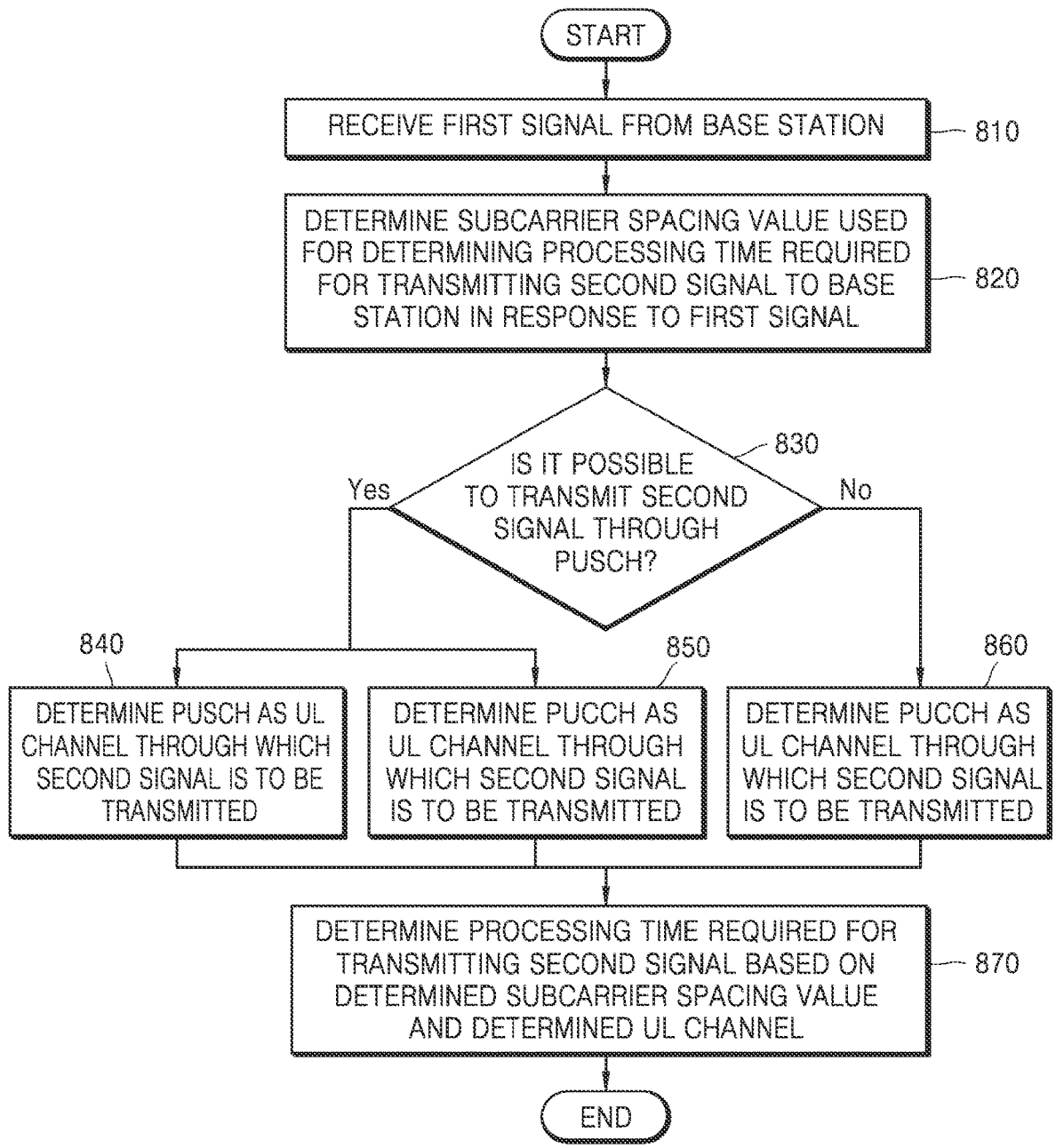
FIG. 8 is a flowchart of a method, performed by a UE, of determining a processing time for transmitting a second signal to a base station when the second signal is transmittable simultaneously through a physical uplink control channel (PUCCH) and a physical uplink shared channel (PUSCH) in response to a first signal regarding DL SPS release received from the base station, according to an embodiment of the disclosure.

FIG. 8 is a flowchart of a method, performed by the UE, of determining a processing time required for transmitting a second signal to a base station when a second signal is simultaneously transmittable through a PUCCH and a PUSCH in response to a first signal regarding DL SPS release received from the base station, according to an embodiment of the disclosure.

Herein below, for convenience, a processing time required for the UE to transmit a second signal to a base station will be shortly referred to as a processing time.

Referring to FIG. 8, in operation 810, the UE may receive the first signal from the base station. Operation 810 may correspond to operation 610 of FIG. 6.

In operation 820, the UE may determine a subcarrier spacing value used for determining a processing time required for transmitting the second signal to the base station in response to the first signal. Operation 820 may correspond to operation 720 of FIG. 7.

In operation 830, the UE may determine whether it is possible to transmit the second signal through the PUSCH.

According to an embodiment of the disclosure, when it is possible for the UE to transmit the second signal through the PUSCH, the UE may determine the UL channel through which the second signal is to be transmitted as the PUSCH in operation 840 or as the PUCCH in operation 850.

When it is possible for the UE to support PUCCH and PUSCH transmission at the same time, the UE may determine one of the PUCCH or the PUSCH through which the second signal is to be transmitted, using methods described below.

Method 1: determine the PUCCH as the UL channel through which the second signal is to be transmitted, regardless of the PUSCH (operation 850)

Method 2: conditionally determine the PUSCH as the UL channel through which the second signal is to be transmitted When it is possible for the UE to transmit the second signal (e.g., a signal including HARQ-ACK information) through the PUSCH, the UE may piggyback the HARQ-ACK information in the PUSCH. As the UE piggybacks the HARQ-ACK information in the PUSCH, a transmission time may increase.

When the UE transmits the HARQ-ACK information as an invalid value to the base station due to a transmission time increasing by the piggyback of the HARQ-ACK information in the PUSCH, the UE may determine the PUCCH as the channel through which the second signal including the HARQ-ACK information is to be transmitted, as long as it is possible for the UE to transmit valid HARQ-ACK information through the PUCCH without piggybacking the HARQ-ACK information in the PUCCH.

When it is possible for the UE to transmit the HARQ-ACK information as a valid value to the base station in spite of an increase in a transmission time due to the piggyback of the HARQ-ACK information in the PUSCH, the UE may determine the PUSCH as the channel through which the second signal including the HARQ-ACK information is to be transmitted in operation 840.

According to an embodiment of the disclosure, when it is not possible for the UE to transmit the second signal through the PUSCH, the UE may determine the PUCCH as the UL channel through which the second signal is to be transmitted, in operation 860.

In operation 870, the UE may determine the processing time based on the subcarrier spacing value used for determining the processing time and the UL channel in which the UE is to transmit the second signal. Operation 870 may correspond to operation 740 of FIG. 7.

Figure 9:
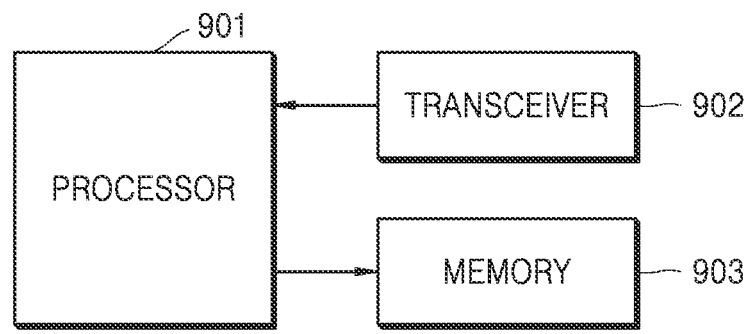
FIG. 9 is a block diagram of a terminal according to an embodiment of the disclosure.

FIG. 9 is a block diagram of a UE according to an embodiment of the disclosure.

Referring to FIG. 9, the UE according to the disclosure may include a processor 901, a transceiver 902, and a memory 903. However, components of the UE are not limited to the above-described example. For example, the UE may include components that are more than or less than the above-described components. The processor 901, the transceiver 902, and the memory 903 may be implemented in a single chip form.

According to an embodiment of the disclosure, the transceiver 902 may transmit and receive a signal to and from the base station. The signal transmitted and received to and from the base station by the UE may include control information and data. The transceiver 902 may include an RF transmitter that up-converts and amplifies a frequency of a transmission signal and an RF signal that low-noise-amplifies a received signal and down-converts a frequency. The transceiver 902 may receive a signal through a radio channel and output the received signal to the processor 901, and transmit a signal output from the processor 901 through the radio channel.

The processor 901 may control a series of processes such that the UE operates according to the above-described embodiment of the disclosure. For example, the processor 901 of the UE may control DL control channel reception using an OFDM signal and RS and data channel transmission/reception according to various embodiments of the disclosure. The processor 901 may include a plurality of processors, and may control determining a processing time for transmitting the second signal to the base station in response to the first signal received from the base station through the transceiver 902 by executing a program stored in the memory 903.

According to an embodiment of the disclosure, programs and data required for an operation of the UE may be stored in the memory 903. Control information or data included in a signal transmitted and received by the UE may be stored in the memory 903. The memory 903 may include a storage medium such as read only memory (ROM), random access memory (RAM), hard-disk, compact disc (CD)-ROM, digital versatile disc (DVD), etc., or a combination thereof. The memory 903 may also include a plurality of memories. According to an embodiment of the disclosure, a program for transmitting and receiving a modulation signal may be stored in the memory 903, and a program for setting and transmitting/receiving a group modulation scheme described before may be stored in the memory 903.

Figure 10:
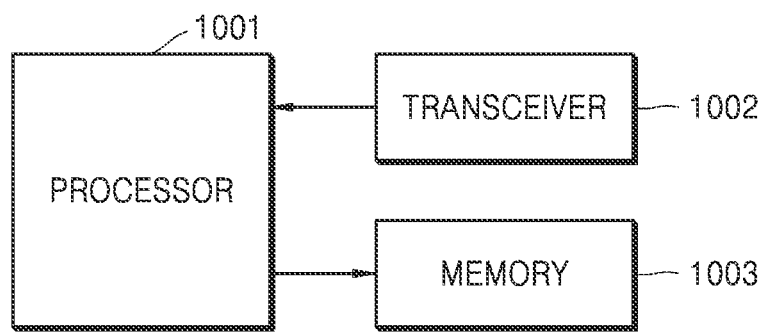
FIG. 10 is a block diagram of a base station according to an embodiment of the disclosure.

FIG. 10 is a block diagram of a base station according to an embodiment of the disclosure.

Referring to FIG. 10, the base station may include a processor 1001, a transceiver 1002, and a memory 1003. However, components of the base station are not limited to the above-described example. For example, the base station may include components that are more than or less than the above-described components. Moreover, the processor 1001, the transceiver 1002, and the memory 1003 may be implemented in a single chip form.

According to an embodiment of the disclosure, the processor 1001 may control a series of processes such that the base station operates according to the above-described embodiment of the disclosure. For example, the processor 1001 of the base station may control DL control channel assignment and transmission using an OFDM signal and RS and data channel resource mapping and transmission/reception according to various embodiments of the disclosure. The processor 1001 may include a plurality of processors, and may control transmission of the first signal to the UE by executing a program stored in the memory 1003.

The transceiver 1002 may transmit and receive a signal to and from the UE. The signal transmitted and received to and from the UE by the base station may include control information and data. According to an embodiment of the disclosure, the transceiver 1002 may include an RF transmitter that up-converts and amplifies a frequency of a transmission signal and an RF signal that low-noise-amplifies a received signal and down-converts a frequency. However, this is merely an example of the transceiver 1002, components of which are not limited to the RF transmitter and the RF receiver. The transceiver 1002 may receive a signal through a radio channel and output the received signal to the processor 1001, and transmit a signal output from the processor 1001 through the radio channel.

According to an embodiment of the disclosure, programs and data required for an operation of the base station may be stored in the memory 1003. Control information or data included in a signal transmitted and received by the base station may be stored in the memory 1003. The memory 1003 may include a storage medium such as read only memory (ROM), random access memory (RAM), hard-disk, compact disc (CD)-ROM, digital versatile disc (DVD), etc., or a combination thereof. The memory 1003 may also include a plurality of memories.

The methods according to the various embodiments of the disclosure described in the claims or specification of the disclosure may be implemented by hardware, software, or a combination thereof.

When the methods are implemented by software, a computer-readable storage medium having stored therein one or more programs (software modules) may be provided. The one or more programs stored in the computer-readable storage medium may be configured for execution by one or more processors in an electronic device. The one or more programs include instructions that cause the electronic device to execute the methods according to the various embodiments of the disclosure described in the claims or the specification of the disclosure.

These programs (software modules and software) may be stored in random access memories (RAMs), non-volatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. The programs may be stored in a memory configured by a combination of some or all of such storage devices. Also, each of the memories may be provided in plurality.

The programs may be stored to an attachable storage device of the electronic device accessible via the communication network such as Internet, Intranet, a local area network (LAN), a wireless LAN (WLAN), or storage area network (SAN), or a communication network by combining the networks. The storage device may access a device performing the embodiment of the disclosure through an external port. Furthermore, a separate storage device in a communication network may access a device performing the embodiment of the disclosure.

In the detailed embodiments of the disclosure, components included in the disclosure have been expressed as singular or plural according to the provided detailed embodiment of the disclosure. However, singular or plural expressions have been selected properly for a condition provided for convenience of a description, and the disclosure is not limited to singular or plural components and components expressed as plural may be configured as a single component or a component expressed as singular may also be configured as plural components.

Meanwhile, the various embodiments of the disclosure disclosed in the specification and drawings have been provided to easily describe the disclosure and to help understanding of the disclosure, and are not intended to limit the scope of the disclosure. In other words, it is apparent to one of ordinary skill in the art that various changes may be made thereto without departing from the scope of the disclosure. Further, the various embodiments of the disclosure may be practiced in combination. For example, a base station and a UE may be managed by combining an embodiment of the disclosure with some parts of another embodiment of the disclosure. Although the various embodiments of the disclosure have been described based on the NR system, modified examples based on the technical spirit of the various embodiments of the disclosure may also be carried out in other systems such as FDD or time division multiplexing (TDD) LTE systems, etc.

According to the current embodiment of the disclosure, in a communication system, the UE may determine a transmission timing for a UL signal related to a DL signal received from the base station.

More specifically, according to the current embodiment of the disclosure, in the communication system, the UE may determine a processing time required for transmitting the UL signal related to the DL signal received from the base station.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for transmitting hybrid automatic repeat request acknowledgement (HARQ-ACK) information by a user equipment (UE) in a wireless communication system, the method comprising:
receiving a physical downlink control channel (PDCCH) including information for downlink semi-persistent scheduling (DL SPS) release from a base station; and
transmitting an uplink channel including a physical uplink shared channel (PUSCH) multiplexed with HARQ-ACK information for the PDCCH including the information for DL SPS release to the base station,
wherein a first symbol of the uplink channel is transmitted at least after a processing time ($T_{proc,3}$) from when a last symbol of the PDCCH is received,
wherein the processing time ($T_{proc,3}$) is calculated based on $T_{proc,3}=(N_{3+1})\cdot(2048+144)\cdot\kappa\cdot 2^{-\mu}\cdot T_c$,
wherein $\mu$ corresponds to a smaller subcarrier spacing parameter among a subcarrier spacing parameter ($\mu_{PDCCH}$) of the PDCCH and a subcarrier spacing parameter ($\mu_{UL}$) of the uplink channel,
wherein $N_3$ is determined based on $\mu$,
wherein $T_c$ is calculated based on $T_c=1/(\Delta f_{max}\cdot N_f)$, in which $\Delta f_{max}$ is $480\cdot 10^3$ Hz, and $N_f$ is 4096, and
wherein $\kappa$ is $\kappa=T_s/T_c=64$, $T_s$ is $1/(\kappa f_{ref}\cdot N_{f,ref})$, $\Delta f_{ref}$ is $15\cdot 10^3$ Hz, and $N_{f,ref}$ is 2048.

2. The method of claim 1,
wherein when $\mu$ is 0, $N_3$ is 10,
wherein when $\mu$ is 1, $N_3$ is 12,
wherein when $\mu$ is 2, $N_3$ is 22, and
wherein when $\mu$ is 3, $N_3$ is 25.

3. The method of claim 1, wherein the first symbol of the uplink channel is transmitted not before a first symbol with a cyclic prefix (CP) starting after the processing time from when the last symbol of the PDCCH is received.

4. The method of claim 1, wherein the PDCCH comprises downlink control information (DCI) including the information for DL SPS release.

5. The method of claim 1, wherein the HARQ-ACK information comprises acknowledgement (ACK) information or negative acknowledgement (NACK) information of the PDCCH including the information for DL SPS release.

6. A user equipment (UE), the UE comprising:
a transceiver; and
at least one processor configured to:
control the transceiver to receive a physical downlink control channel (PDCCH) including information for downlink semi-persistent scheduling (DL SPS) release from a base station; and
control the transceiver to transmit an uplink channel including a physical uplink shared channel (PUSCH) multiplexed with hybrid automatic repeat request acknowledgement (HARQ-ACK) information for the PDCCH including the information for DL SPS release to the base station, wherein a first symbol of the uplink channel is transmitted at least after a processing time ($T_{proc,3}$) from when a last symbol of the PDCCH is received, wherein the processing time ($T_{proc,3}$) is calculated based on $T_{proc,3} = (N_3+1) \cdot (2048+144) \cdot \kappa \cdot 2^{-\mu} \cdot T_c$, wherein $\mu$ corresponds to a smaller subcarrier spacing parameter among a subcarrier spacing parameter ($\mu_{PDCCH}$) of the PDCCH and a subcarrier spacing parameter ($\mu_{UL}$) of the uplink channel, wherein $N_3$ is determined based on $\mu$, wherein $T_c$ is calculated based on $T_c = 1/(\Delta f_{max} \cdot N_f)$, in which $\Delta f_{max}$ is $480 \cdot 10^3$ Hz, and $N_f$ is 4096, and wherein $\kappa$ is $\kappa = T_s/T_c = 64$, $T_s$ is $1/(\Delta f_{ref} \cdot N_{f,ref})$, $\Delta f_{ref}$ is $15 \cdot 10^3$ Hz, and $N_{f,ref}$ is 2048.

7. The UE of claim 6,
wherein when $\mu$ is 0, $N_3$ is 10,
wherein when $\mu$ is 1, $N_3$ is 12,
wherein when $\mu$ is 2, $N_3$ is 22, and
wherein when $\mu$ is 3, $N_3$ is 25.

8. The UE of claim 6, wherein the first symbol of the uplink channel is transmitted not before a first symbol with a cyclic prefix (CP) starting after the processing time from when the last symbol of the PDCCH is received.

9. The UE of claim 6, wherein the PDCCH comprises downlink control information (DCI) including the information for DL SPS release.

10. The UE of claim 6, wherein the HARQ-ACK information comprises acknowledgement (ACK) information or negative acknowledgement (NACK) information of the PDCCH including the information for DL SPS release.

11. A method for receiving hybrid automatic repeat request acknowledgement (HARQ-ACK) information by a base station in a wireless communication system, the method comprising:

transmitting a physical downlink control channel (PDCCH) including information for downlink semi-persistent scheduling (DL SPS) release to a user equipment (UE);

scheduling an uplink channel that is to be transmitted after a processing time ($T_{proc,3}$) from when a last symbol of the PDCCH is transmitted; and receiving the uplink channel including a physical uplink shared channel (PUSCH) multiplexed with HARQ-ACK information for the PDCCH including the information for DL SPS release from the UE, wherein a first symbol of the uplink channel is received at least after the processing time ($T_{proc,3}$) from when a last symbol of the PDCCH is transmitted, wherein the processing time ($T_{proc,3}$) is calculated based on $T_{proc,3} = (N_3+1) \cdot (2048+144) \cdot \kappa \cdot 2^{-\mu} \cdot T_c$, wherein $\mu$ corresponds to a smaller subcarrier spacing parameter among a subcarrier spacing parameter ($\mu_{PDCCH}$) of the PDCCH and a subcarrier spacing parameter ($\mu_{UL}$) of the uplink channel, wherein $N_3$ is determined based on $\mu$, wherein $T_c$ is calculated based on $T_c = 1/(\Delta f_{max} \cdot N_f)$, in which $\Delta f_{max}$ is $480 \cdot 10^3$ Hz, and $N_f$ is 4096, and wherein $\kappa$ is $\kappa = T_s/T_c = 64$, $T_s$ is $1/(\kappa f_{ref} \cdot N_{f,ref})$, $\Delta f_{ref}$ is $15 \cdot 10^3$ Hz, and $N_{f,ref}$ is 2048.

12. The method of claim 11,
wherein when $\mu$ is 0, $N_3$ is 10,
wherein when $\mu$ is 1, $N_3$ is 12,
wherein when $\mu$ is 2, $N_3$ is 22, and
wherein when $\mu$ is 3, $N_3$ is 25.

13. The method of claim 11, wherein the first symbol of the uplink channel is received not before a first symbol with a cyclic prefix (CP) starting after the processing time from when the last symbol of the PDCCH is transmitted.

14. A base station, the base station comprising:
a transceiver; and
at least one processor configured to:
control the transceiver to transmit a physical downlink control channel (PDCCH) including information for downlink semi-persistent scheduling (DL SPS) release to a user equipment (UE);
schedule an uplink channel that is to be transmitted after a processing time ($T_{proc,3}$) from when a last symbol of the PDCCH is transmitted; and
control the transceiver to receive the uplink channel including a physical uplink shared channel (PUSCH) multiplexed with hybrid automatic repeat request acknowledgement (HARQ-ACK) information for the PDCCH including the information for DL SPS release from the UE, wherein a first symbol of the uplink channel is received at least after the processing time ($T_{proc,3}$) from when a last symbol of the PDCCH is transmitted, wherein the processing time ($T_{proc,3}$) is calculated based on $T_{proc,3} = (N_3+1) \cdot (2048+144) \cdot \kappa \cdot 2^{-\mu} \cdot T_c$, wherein $\mu$ corresponds to a smaller subcarrier spacing parameter among a subcarrier spacing parameter ($\mu_{PDCCH}$) of the PDCCH and a subcarrier spacing parameter ($\mu_{UL}$) of the uplink channel, wherein $N_3$ is determined based on $\mu$, wherein $T_c$ is calculated based on $T_c = 1/(\Delta f_{max} \cdot N_f)$, in which $\Delta f_{max}$ is $480 \cdot 10^3$ Hz, and $N_f$ is 4096, and wherein $\kappa$ is $\kappa = T_s/T_c = 64$, $T_s$ is $1/(\Delta f_{ref} \cdot N_{f,ref})$, $\Delta f_{ref}$ is $15 \cdot 10^3$ Hz, and $N_{f,ref}$ is 2048.

* * * * *